United States Patent
Lutz

[19]

[11] Patent Number: 5,820,291
[45] Date of Patent: Oct. 13, 1998

[54] METHOD FOR CONNECTING A TORQUE-TRANSMITTING SHAFT JOURNAL WITH A STRUCTURAL COMPONENT

[75] Inventor: Christian Lutz, Nüziders, Austria

[73] Assignee: Etablissement Supervis, Vaduz, Liechtenstein

[21] Appl. No.: 796,644

[22] Filed: Feb. 7, 1997

[30] Foreign Application Priority Data

Feb. 17, 1996 [DE] Germany ................. 196 05 894.5

[51] Int. Cl.⁶ ..................................................... B25G 3/18
[52] U.S. Cl. ........................ 403/328; 403/325; 403/297; 29/517; 29/523
[58] Field of Search ..................................... 403/315, 321, 403/322, 324, 325, 359, DIG. 6, 328, 297, 277; 29/516, 517, 523

[56] References Cited

U.S. PATENT DOCUMENTS

| | | | |
|---|---|---|---|
| 4,289,414 | 9/1981 | Recker | 403/325 X |
| 4,523,871 | 6/1985 | Recker | 403/322 X |
| 5,253,947 | 10/1993 | Petrzelka et al. | 403/277 X |
| 5,522,669 | 6/1996 | Recker | 403/325 X |
| 5,577,859 | 11/1996 | Nau . | |

FOREIGN PATENT DOCUMENTS

| | | |
|---|---|---|
| 0092669 | 11/1983 | European Pat. Off. . |
| 2 222 866 | 3/1990 | United Kingdom . |

Primary Examiner—Brian K. Green
Assistant Examiner—William L. Miller
Attorney, Agent, or Firm—Anderson, Kill & Olick, P.C.

[57] ABSTRACT

A method of manufacturing a device for connecting a torque-transmitting shaft journal, which is provided with a channel toothing and has a annular groove adjacent to a free end surface of the shaft journal with a structural component, the connecting device including a sleeve for receiving the shaft journal connectable with the structural component and having an inner channel toothing corresponding to the channel toothing of the shaft journal, and a spring-biased bushing for receiving the sleeve and axially displaceable relative hereto, the method including effecting, after pushing the sleeve receiving bushing over the sleeve, a reduction of the bushing at least along a portion of its longitudinal extent thereof or an expansion of an end region of the sleeve to provide a form-locking connection between the sleeve and the bushing which defines a stop limiting a displacement path of the bushing relative to the sleeve, and a device manufactured by the above-described method.

3 Claims, 4 Drawing Sheets

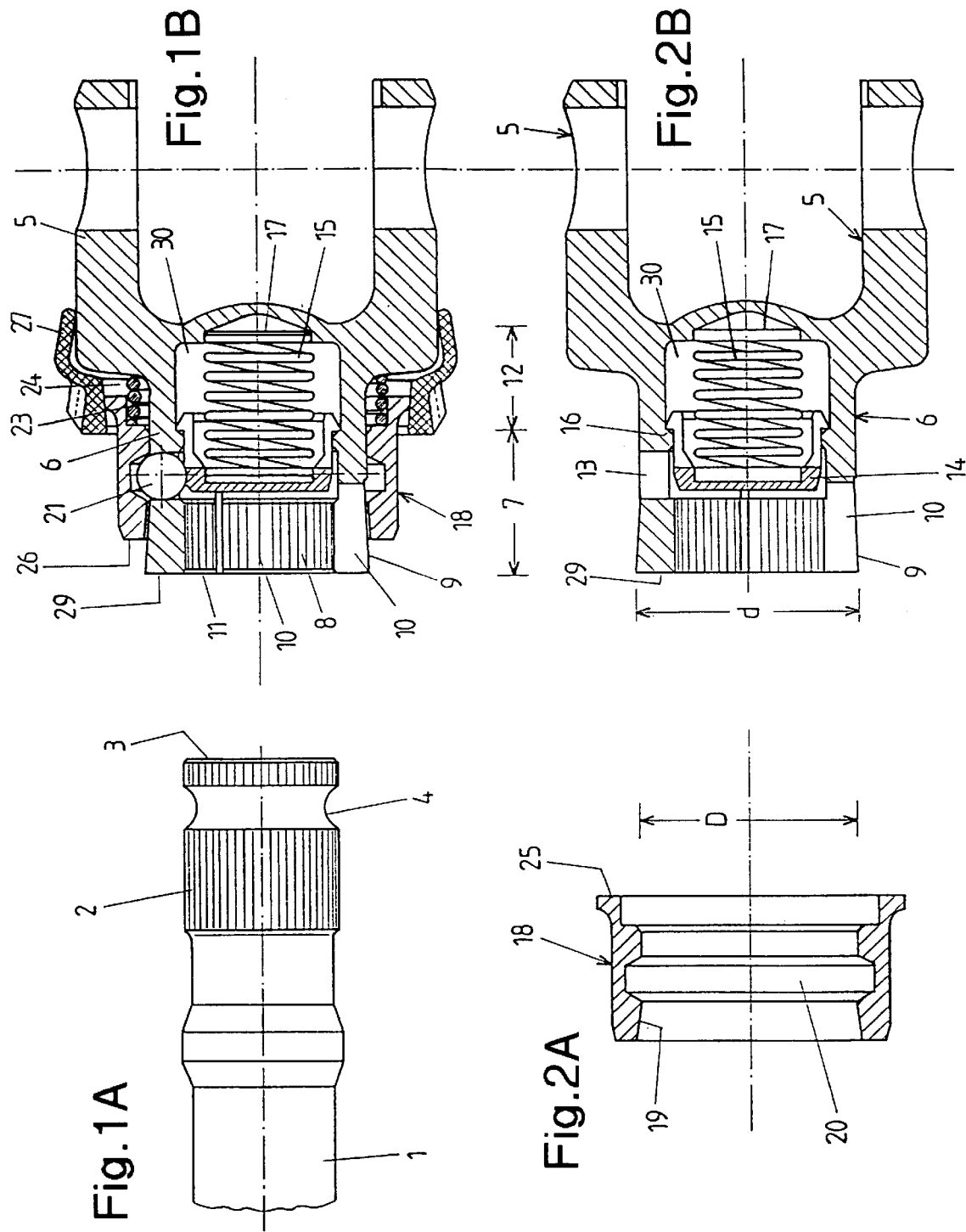

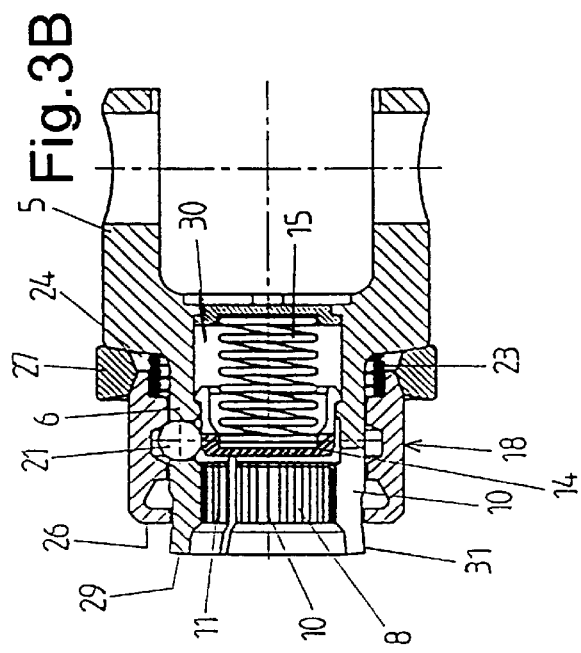
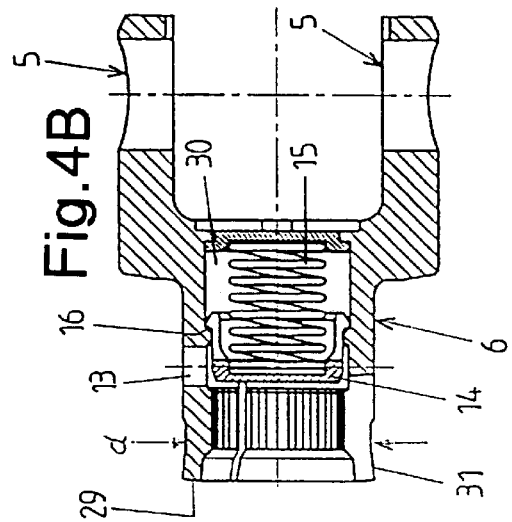
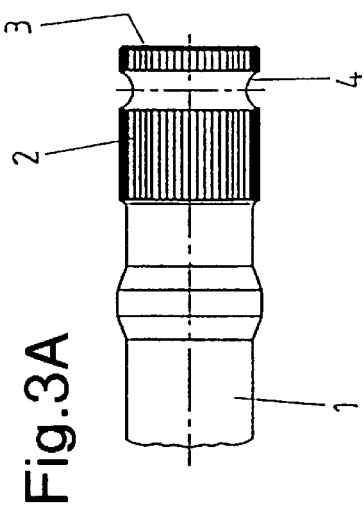
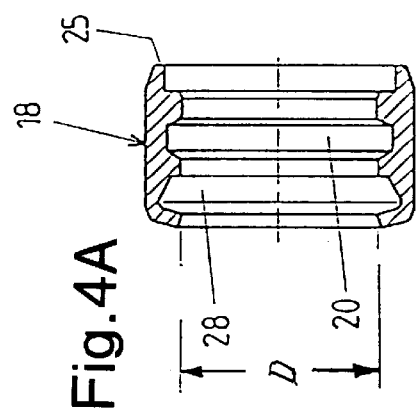

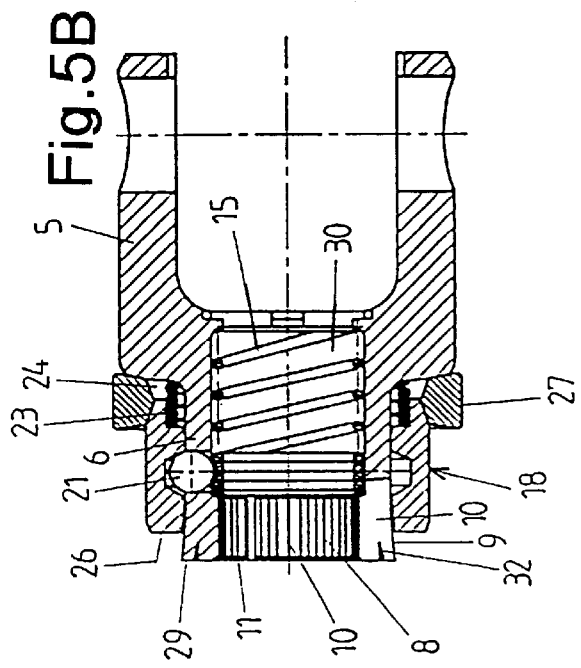
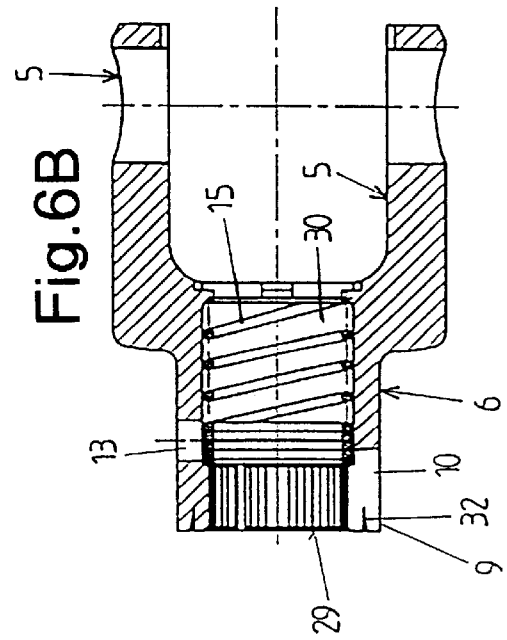
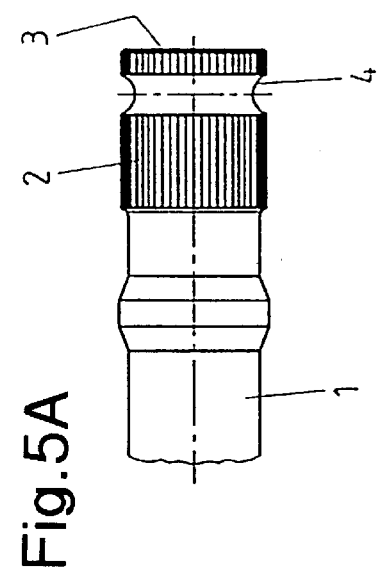
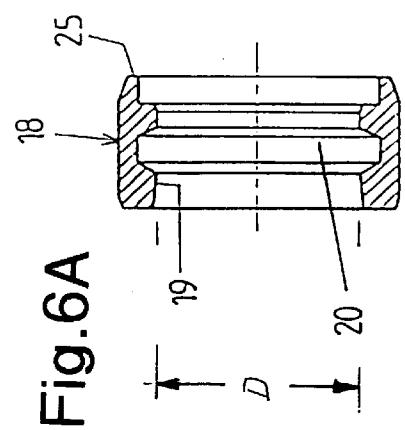

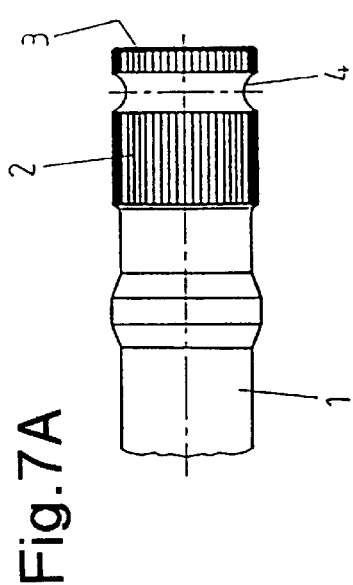
Fig.7A
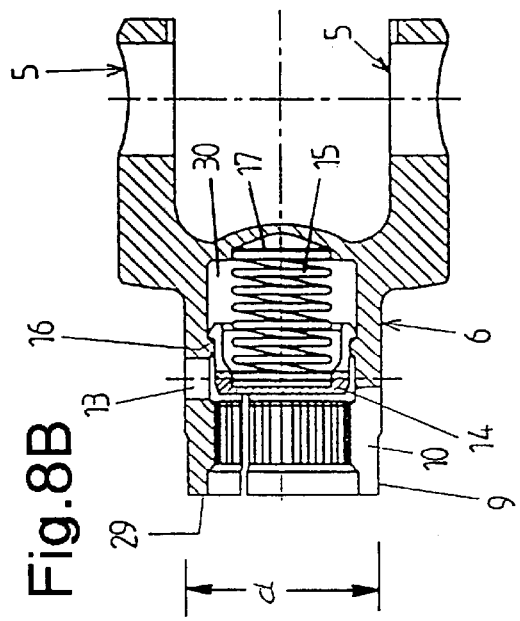
Fig.7B
Fig.8A
Fig.8B

METHOD FOR CONNECTING A TORQUE-TRANSMITTING SHAFT JOURNAL WITH A STRUCTURAL COMPONENT

BACKGROUND OF THE INVENTION

1. Field of the Invention

The present invention relates to a method of manufacturing a device for connecting a torque-transmitting shaft journal, which is provided with a channel toothing and has an annular groove adjacent to a free end surface of the shaft journal, with a structural component, the connecting device including a sleeve for receiving the shaft journal, connectable with the structural component and having an inner channel toothing corresponding to the channel toothing of the shaft journal, and a spring-biased bushing for receiving the sleeve and axially displaceable relative thereto, the shaft journal-receiving sleeve including a first section having a plurality of longitudinal slots and provided with the inner channel toothing, and a second section adjoining the first section and having in a cross-sectional plane thereof at least one hole for receiving a locking ball engageable with the annular groove of the shaft journal when the shaft journal is received in the sleeve for retaining the shaft journal, wherein the at least one hole has a diameter equal a diameter of the locking ball and more than twice exceeding a depth of the shaft journal groove, with an axially displaceable locking member provided for closing the at least one hole, and a spring for biasing the locking member to a closing position thereof both provided in the shaft journal-receiving sleeve, and with the sleeve receiving bushing having a smallest possible inner diameter exceeding a largest diameter of the sleeve, and an inner groove for receiving the locking ball.

2. Description of the Prior Art

A device of this type is shown and described in German Publication No. P 43 32 485. In this known construction, the fork-shaped structural component and the longitudinally slotted sleeve with inner channel toothing are produced separately and are only connected with each other after the bushing was pushed over the sleeve. The bushing is pushed from the side of the sleeve which is subsequently connected with the structural component. Because the torque is transmitted by the fork-shaped component and the sleeve as well as by their connection location, it is advisable to form the sleeve and the fork-shaped component as one piece. Such one-piece element formed of a fork-shaped component and a sleeve and forming part of a device of a similar type, as described above, is per so known (see European Publication EU-A1-92 669). In this known construction the sleeve with an inner channel toothing is not slotted, and it has a cylindrical outer surface, so that the bushing can be pushed over the sleeve from the side of the sleeve from which the shaft journal is inserted into the sleeve. The bushing, which is displaceable along the sleeve, is prevented from falling off by a stationary ring provided at the end surface of the sleeve. In this known construction, the displaceable bushing has one and only function, namely, either block or release the locking balls. Despite the high costs of the known construction, a backlash-free connection of the connectable parts is not insured in contrast to the construction described in German Publication No. 4332485, in which because of a longitudinally slotted sleeve and a conical outer surface and correspondingly shaped bushing, the flank clearance between the engaging each other channel toothings is eliminated so that the torque can be transmitted backlash-free, which is particularly necessary in steering columns of motor vehicles. However, the present invention is not limited to this particular application.

An object of the present invention is a method of manufacturing of a device, which forms subject matter of the present invention, and according to which the sleeve and the fork-shaped component can be formed as one-piece part and, despite the conical outer surface of the sleeve, the bushing can be mounted from the side of the sleeve, from which the shaft journal is inserted into the sleeve.

SUMMARY OF THE INVENTIONS

This and other objects of the present invention, which will become apparent hereinafter, are achieved by effecting, after pushing the sleeve receiving bushing over the sleeve, a reduction of the inner diameter of the bushing at least along a portion of a longitudinal extent thereof and/or an expansion of an end region of the sleeve to provide a form-locking connection between the sleeve and the bushing which defines a stop limiting a displacement path of the bushing relative to the sleeve. Thanks to this step, it is possible to mount the bushing on the sleeve from its shaft journal-receiving side. The amount of the diameter reduction of the bushing, which is pushed over the sleeve, or the amount of expansion of the end side region of the sleeve is limited to an extent that would insure the required displacement of the bushing over the sleeve.

The embodiments of the invention will be illustrated below on the basis of accompanying drawings, with the invention not being limited in any way by the shown embodiments.

BRIEF DESCRIPTION OF THE DRAWING:

In the Drawings:

FIG. 1A shows a shaft journal to be connected with a structural component by a device according to the present invention;

FIG. 1B shows a cross-sectional view of a device according to the present invention for connecting a shaft journal having a channel toothing with a structural component equipped with a sleeve with an inner channel toothing;

FIG. 2A hows a cross-sectional view of a bushing forming part of the device according to the present invention shown in FIG. 1A;

FIG. 2B shows a cross-sectional view of a fork-shaped link element forming part of the device according to the present invention shown in FIG. 1A;

FIGS. 3A, 5A and 7A show embodiments of another shaft journals to be connected to structural components by a device according to the present invention;

FIGS. 3B, 5B and 7B show, respectively, cross-sectional views of further embodiments of a device according to the present invention;

FIGS. 4A, 6A and 8A show, respectively, cross-sectional views of different embodiments of a bushing forming part of the respective embodiments of a device according to the present invention; and FIGS. 4B, 6B and 8B show, respectively, cross-sectional views of different embodiments of a fork-shaped link elements forming part of the respective embodiments of a device according to the present invention.

DETAILED DESCRIPTION OF THE PREFERRED EMBODIMENTS

The present invention will now be described in detail with references to the drawings which show different embodiments of a device according to the present invention and in which the same elements have the same reference numerals.

A shaft journal 1 of a shaft which, for example, forms a steering shaft of a motor vehicle steering mechanism, has at its end a channel toothing 2 and, adjacent to its end surface 3, an annular groove 4 having a circular cross-section.

The shaft journal 1 is connectable with a universal joint of which only the joint fork 5 is shown in FIG. 1. The joint fork 5 is formed integrally with a sleeve 6. The sleeve 6 has a first section 7 with a channel toothing 8, and an outer peripheral surface 9 of the section 7 has a conical taper which diverges toward an end surface 29 of the sleeve 6 at an angle, for example, of approximately two degrees. A plurality of axially parallel longitudinal slots 10 divide the section 7 of the sleeve 6 circumferentially in separate resilient strips 11. The axial length of the toothing 8 is at least as large as that of the toothing 2 of the shaft journal 1.

The first section 7 of the sleeve 6 is adjoined by a second section 12 provided with a blind bore 30 and having in its cross-sectional plane, which lies adjacent to the first section 7, a plurality of holes 13 formed in its circumference. The section 12 is somewhat longer than the section 7. Inside of the second section 12, lies a cup-shaped locking member 14 which is held against an inner shoulder 16 in the transition region between the first section 7 and the second section 12 by a biasing force of a spring 15. The axial length of the cup-shaped locking member 14 is at least as large as the diameter of the holes 13. The spring 15, which is located inside of the sleeve 6 has a small spring rate and is supported against the bottom 17 of the blind bore 30 at its other end.

The sleeve 6 is received in a bushing 18 which is axially displaceable relative to the sleeve 6. The bushing 18 has a bore portion 19 corresponding to the taper of the sleeve 7 and an annular groove 20, which lies adjacent, in an axial direction of the bushing 19, to the bore portion 19 and in which a plurality of locking balls 21, the number of which corresponds to the number of holes 13, is located. The diameter of the locking balls 21 correspond to the diameter of the holes 13. Further, a helical spring 23 is located in the end side recess 22 of the bushing 18. The spring 23 is supported at its end against a shoulder of the joint fork 5. The sleeve 6 extends through the helical spring 23. The spring rate of the spring 23 is a multiple of that of the spring 15 located in the sleeve 6 and cooperating with the locking member 14.

The diameter of the holes 13, which are formed in the cross-sectional plane of the second section 12 of the sleeve 6, is as large as the diameter of the locking balls 21, and the depth of the groove 4, which is preferably provided adjacent to the end surface 3 of the shaft journal 1, is less than a half of the diameter of the locking balls 21. The width of the annular space, which is limited by the bottom of the groove 20 formed in the bushing 18, on one hand, and by the locking member 14, which is located in its locking position, on the other hand, corresponds at least to the diameter of the locking balls 21. The cup-shape of the locking member 14 provides for retaining and displacement of the spring 15 the end of which is received in the cup-shaped locking member 14. The spring 23, which has a greater spring rate, lies in an annular space which is limited by the peripheral surface of the second section 12 of the sleeve 6 and the wall of the recess 22 of the bushing 18 in which the spring 23 is received. The axial length of this annular space is somewhat shorter than the length of the compressed, pre-loaded spring 23 (Fir. 1). The length of the sleeve 6 is greater than the length of the bushing 18. The groove 20, which is formed in the inner surface of the bushing 18 for receiving the locking balls 21, is provided approximately in the middle of the longitudinal extent of the bushing 18.

FIG. 1 shows the connectable parts in an aligned condition with respect to each other, but still separated from each other. The inner spring 15 biases the cup-shaped locking number 14 against the shoulder 16 whereby the locking balls 21 are prevented from entering into the sleeve 6 through holes 13. At that, the outer spring 23 is pre-loaded, and the upper portion of the sleeve 6 or its section 7 partially extends beyond the end surface 26 of the bushing 18.

When the two parts are assembled with each other, the shaft journal 1 or its toothing 2 is advanced into the section 7 of the sleeve 6 until its end surface 3 engages the locking member 14. Upon further pushing of the two parts together, the locking member 14 will be pushed back by the end surface 3 of the shaft journal 1 against the biasing force of the spring 15, which requires application of a rather very small force, whereby the locking member 14 unblocks the holes 13, and the locking balls 21 enter in these holes 13 as soon as the groove 4 of the shaft journal 1 reaches the corresponding cross-sectional plane of the sleeve 6 in which the holes 13 are located. Here, the pre-loaded spring 23 is actuated and pushes the bushing 18 outwardly whereby, on one hand, the locking balls 13, which fell into the holes 13, are retained in their locking position and, on the other hand, the strips 11, which are formed by slots 10 in the section 7 of the sleeve 7, become compressed so that both toothings 2 and 8 become connected with each other without any backlash. Thereby, after a backlash-free connection in a rotational direction of the parts, a satisfactory torque transmission in accordance with calculation is provided, as required in motor vehicle steering mechanisms.

The described connection can be release again. To this end, the bushing 18 is pushed back against the biasing force of the spring 23 until the locking balls 21 are located beneath the groove 20. At that moment, the balls 21 are pushed into the groove 20, which permits to withdraw the shaft journal 1 out of the sleeve 6.

In order to protect the annular space 24, which is limited, on one hand, by a shoulder of the joint fork 5 and, on the other hand, by an inner end surface 25 of the bushing 18, from penetration of dirt, there is provided a collar 27 formed of a resilient material. At that, the corresponding section of the collar 27 adjacent to the sleeve 6 is so formed that it does not hinder the displacement of the bushing 18 while adequately sealing it against penetration of dirt.

As the joint fork 5 and the sleeve 6 are formed integrally with each other as one-piece and as the outer peripheral surface 9 of the sleeve 6 conically diverges toward the end surface 29 of the sleeve 6, it can be seen that the bushing 18, which should cooperate with the outer peripheral surface 9 of the sleeve 6, can be simply placed on the one-piece structural component formed of the joint fork 5 and the sleeve 6. According to the invention, the bushing 18 can be formed with a smallest inner diameter D which is only slightly larger than the end side diameter d of the sleeve 6. Practically, the difference of tenths of mm is sufficient. For example, if diameter d is 27 mm, the bushing 18 can be formed with an inner diameter D of 27.2 mm.

This diameter ratio permits to easily push the bushing 18 onto the sleeve 6 (after the spring 18 and locking balls 21 are placed into the bushing 18), with subsequent reduction of its diameter, by an appropriate tool, to D=26 mm, based on the initial diameter of 27 mm. This insures reliable positioning of the bushing 18 on the sleeve 6, without limiting the necessary axial displacement capability of the bushing 18 required for assembly and disassembly of the connection. However, very carefully and high-precision operational steps are required in order not to exceed the necessary amount of the reduction, which is required for normal functioning of the device, because the bushing 18 could be wedged on the sleeve 6, if the amount of the diameter reduction is exceeded. During the diameter reduction, the bushing 18 is held with its end surface 25 against a stationary abutment. The diameter reduction of the bushing 18 is effected with a hollow tool which is axially displaced over the bushing 18 so that the bushing 18 is reduced as a whole which provides for a direct corresponding reduction of the circumference of the bushing 18. The connection, which was described with reference to FIGS. 1A and 1B, is effected in such a way that the bushing should be displaced by the biasing force of the spring 23 only a predetermined distance relative to the sleeve 6 so that, on one hand, the locking balls 21, which fell into the groove 4 of the shaft journal 1, are retained in their locking position and, on the other hand, the strips 11 of the sleeve 6, which are formed by longitudinal slots 10, are pressed forward the toothing 2 of the shaft journal 1 by the conical bore 19 of the bushing 18 to thereby obtain a desired backlash-free form-locking connection.

The embodiment shown in FIGS. 3A–4B differs from the above-described embodiment in that the edge region of a not yet mounted bushing 18 has an undercut 28. The mouth-side edge region 31 of the sleeve 6 has a conical taper, however, the base diameter of this conical taper is equal to or is smaller than the diameter of the cylindrical portion of the sleeve 6 which occupies a larger part of the longitudinal extent of the sleeve 6. When the bushing 18 is pushed over the sleeve 6, the edge region of the bushing 18 with the undercut 28, preferably, the entire circumference of the edge region is compressed. Thereby, the inner diameter of this edge region is reduced, and a desired form-locking connection is obtained.

In the embodiment of FIGS. 5A–6B, the sleeve 6 has the same diameter along its entire longitudinal extent. The bushing 18 has a shape corresponding to the shape of the bushing 18 shown in FIG. 2A. In the end face 29 of the sleeve 6, there is provided an annular slot 32, which is formed, e.g., by cutting-in or milling. After the bushing 18 is pushed over the sleeve 6, the portion of the sleeve 6, which lies outwardly of the slot 32, is bent outwardly.

In the embodiment showing in FIGS. 7A–8B, the sleeve 6 has a cylindrical shape along substantially entire length thereof, with only the diameter of the region, which is adjacent to the support region of the sleeve 6, being slightly reduced. In addition, the toothing 8 is slightly offset with respect to the end surface 29. After the bushing 18 is pushed onto the sleeve 6, the end side region of the sleeve is slightly expanded so that its outer contour adopts a conical shape, as shown in FIG. 7B.

In all cases, the widening or reduction should be big enough to provide for an adequate form-locking connection between the sleeve 6 and the bushing 18, so that the bushing 18 after being pushed against the biasing force of the spring 23, is pushed by the spring 23, after the latching of the locking balls 21 in the groove 4 of the shaft journal 1, so far to the left that the strips 11 are radially pressed toward the toothing 2 of the shaft journal 1 to an extent which insures obtaining of a desired backlash-free form-locking connection.

Though the present invention was shown and described with reference to the preferred embodiments, various modifications thereof will be apparent to those skilled in the art and, therefore, it is not intended that the invention be limited to the disclosed embodiments or details thereof, and departure can be made there from within the spirit and scope of the appended claims.

What is claimed is:

1. A method of manufacturing a device for connecting a torque-transmitting shaft journal, which is provided with a channel toothing and has an annular groove adjacent to a free end surface of the shaft journal, with a structural component, the connecting device comprising a sleeve for receiving the shaft journal and formed as one piece with the structural component and having an inner channel toothing corresponding to the channel toothing of the shaft journal, and a spring-biased bushing for receiving the shaft journal-receiving sleeve and axially displaceable relative thereto, the method comprising the steps of:

providing in the shaft journal-receiving sleeve a first section provided with the inner channel toothing, and a second section adjoining the first section and having in a cross-sectional plane thereof at least one hole for receiving at least one locking ball engageable with the annular groove of the shaft journal when the shaft journal is received in the sleeve for retaining the shaft journal, wherein the at least one hole has a diameter equal to a diameter of the at least one locking ball and more than twice exceeding a depth of the shaft journal groove;

providing, in the shaft journal-receiving sleeve, an axially displaceable locking member for closing the at least one hole, and a spring for biasing the locking member to a closing position thereof;

providing the spring-biased bushing having a smallest possible inner diameter exceeding a largest diameter of the shaft journal receiving sleeve, and an inner groove for receiving the at least one locking ball;

pushing the spring biased bushing over the shaft journal-receiving sleeve from a shaft journal receiving side; and thereafter, effecting at least one of a reduction of the inner diameter of the spring-biased bushing at least along a portion of a longitudinal extent thereof and an expansion of an end region of the shaft journal-receiving sleeve to provide a form-locking connection between the shaft-journal receiving sleeve and the spring-biased bushing which defines a stop limiting a displacement path of the spring-biased bushing relative to the shaft journal receiving sleeve.

2. The method as set forth in claim 1, wherein the step of effecting the at least one of the reduction of the bushing and the expansion of the end region of the sleeve includes at least one of limiting an amount of the diameter reduction of the bushing and limiting an amount of the end region expansion of the sleeve to an extent insuring displaceability of the bushing relative to the sleeve.

3. The method as set forth in claim 1, wherein the step of effecting the at least one of the reduction of the bushing and the expansion of the end region of the sleeve comprises expansion of the end region of the sleeve by cutting in an annular slot in an end surface of the sleeve, with a subsequent expansion of a section of the end region lying above the slot radially outwardly.

* * * * *